(12) United States Patent
Marti et al.

(10) Patent No.: US 6,641,359 B1
(45) Date of Patent: Nov. 4, 2003

(54) METHOD OF MANUFACTURING, PACKING AND TRANSPORTING COMPUTERS

(75) Inventors: Kerry W. Marti, Jefferson, WI (US); Craig S. Schiefelbein, Oconomowoc, WI (US)

(73) Assignee: Paragon Development Systems, Oconomowoc, WI (US)

(*) Notice: Subject to any disclaimer, the term of this patent is extended or adjusted under 35 U.S.C. 154(b) by 0 days.

(21) Appl. No.: 09/655,630

(22) Filed: Sep. 5, 2000

Related U.S. Application Data

(63) Continuation of application No. 09/072,845, filed on May 5, 1998, now Pat. No. 6,135,706.

(51) Int. Cl.[7] .................... B60P 1/00; B65G 67/00
(52) U.S. Cl. ..................... 414/812; 414/341
(58) Field of Search ................... 414/812, 341; 705/26; 206/521; 290/47.35

(56) References Cited

U.S. PATENT DOCUMENTS

| | | | |
|---|---|---|---|
| 1,640,263 A | 8/1927 | Burgett | |
| 2,846,092 A | 8/1958 | Garnett | |
| 5,040,690 A | 8/1991 | Vander Schuot | |
| 5,163,806 A | 11/1992 | Robertson et al. | |
| 5,190,302 A | 3/1993 | Trotta | |
| 5,299,699 A * | 4/1994 | Cole | 211/187 |
| 5,494,157 A | 2/1996 | Golenz et al. | |
| 5,505,473 A | 4/1996 | Radcliffe | |
| 5,713,584 A | 2/1998 | Crane | |
| 5,813,540 A | 9/1998 | Vollbrecht et al. | |
| 5,848,798 A | 12/1998 | Halvorson, Jr. et al. | |
| 6,008,621 A * | 12/1999 | Madison et al. | 320/107 |
| 6,218,796 B1 * | 4/2001 | Kozlowski | 318/280 |

FOREIGN PATENT DOCUMENTS

| | | |
|---|---|---|
| FR | 2490173 | 3/1982 |
| JP | 6-80217 | 3/1994 |

OTHER PUBLICATIONS

"Bretford Laptop Storage Cart", author unknown, C.E.S. Company, 2 pages, 2000.*

* cited by examiner

*Primary Examiner*—Richard Chilcot
*Assistant Examiner*—Andrew Joseph Rudy
(74) *Attorney, Agent, or Firm*—Michael Best & Friedrich LLP

(57) ABSTRACT

A method of manufacturing, packing, and transporting a plurality of computers, including the steps of assembling a plurality of computers, providing a rack adapted to support the computers, and positioning the computers onto the rack. The method continues by loading the rack onto a transport vehicle at a first location (e.g., at the manufacturing facility), moving the loaded transport vehicle to a second location (e.g., at the buyer's facility), unloading the rack from the transport vehicle, and removing the computers from the rack. The providing step can include the step of placing a shock-absorbing pad on the rack, and the positioning step can comprise positioning the computers onto the shock-absorbing pad. In addition, a shock-absorbing pad can be positioned above and on the sides of the plurality of computers. In one embodiment, the rack includes rollers, in which case the loading step includes rolling the rack onto the transport vehicle, and the unloading step includes rolling the rack off of the transport vehicle.

19 Claims, 5 Drawing Sheets

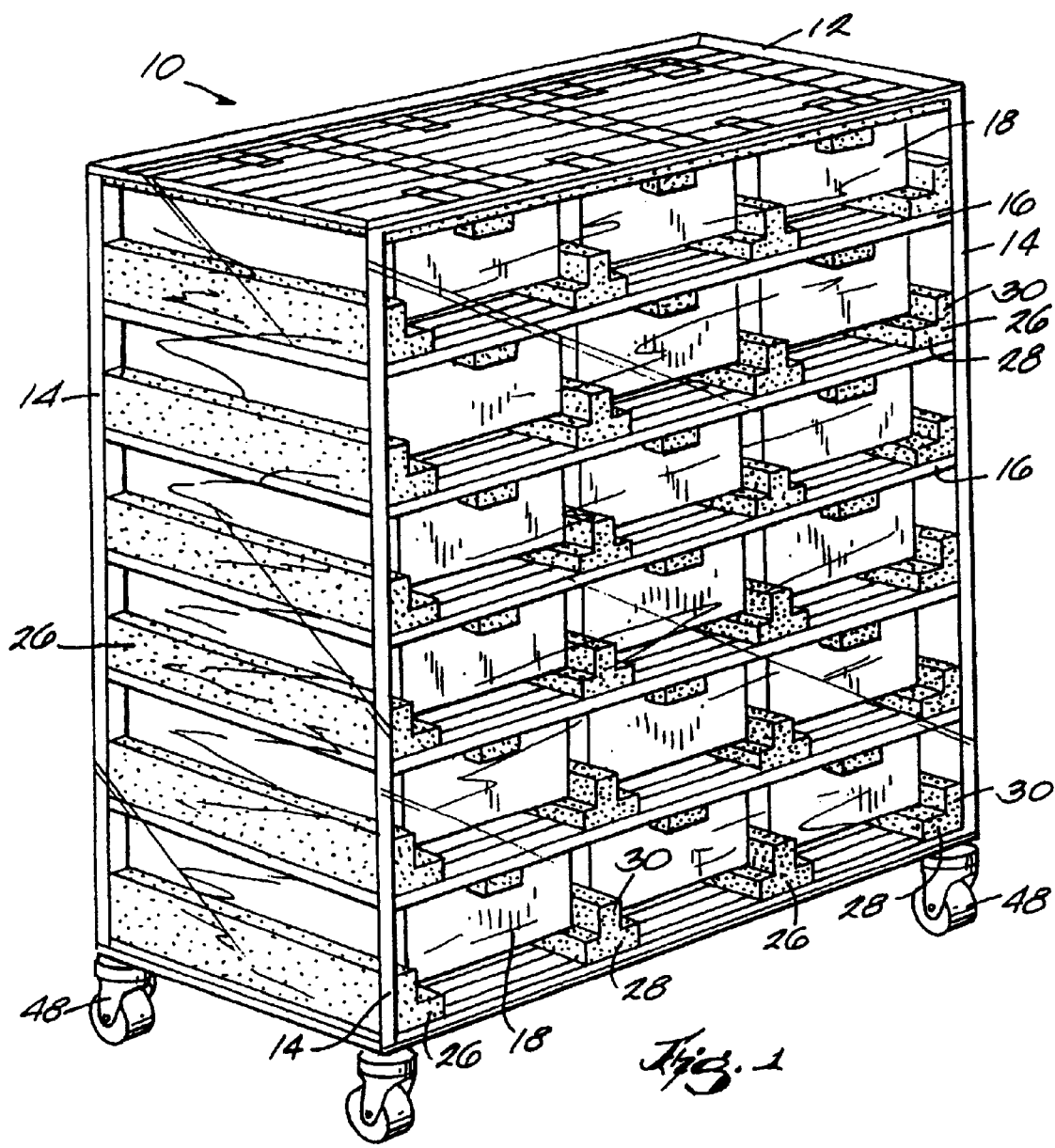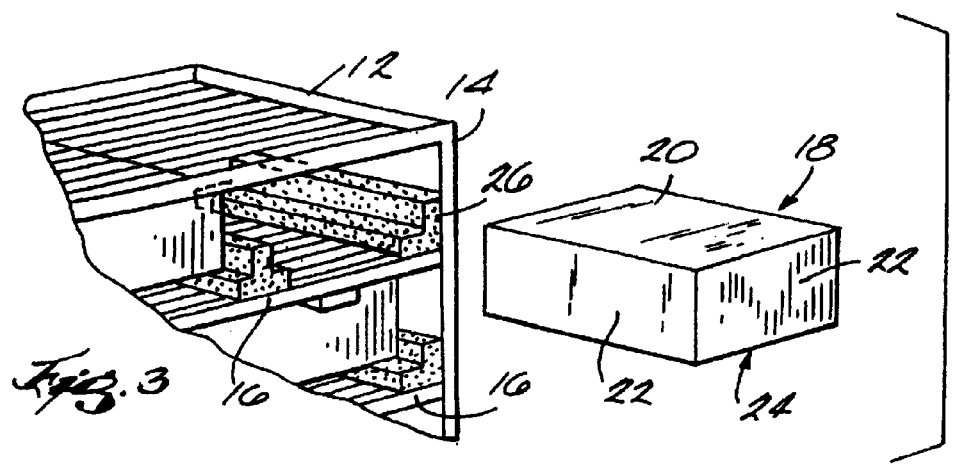

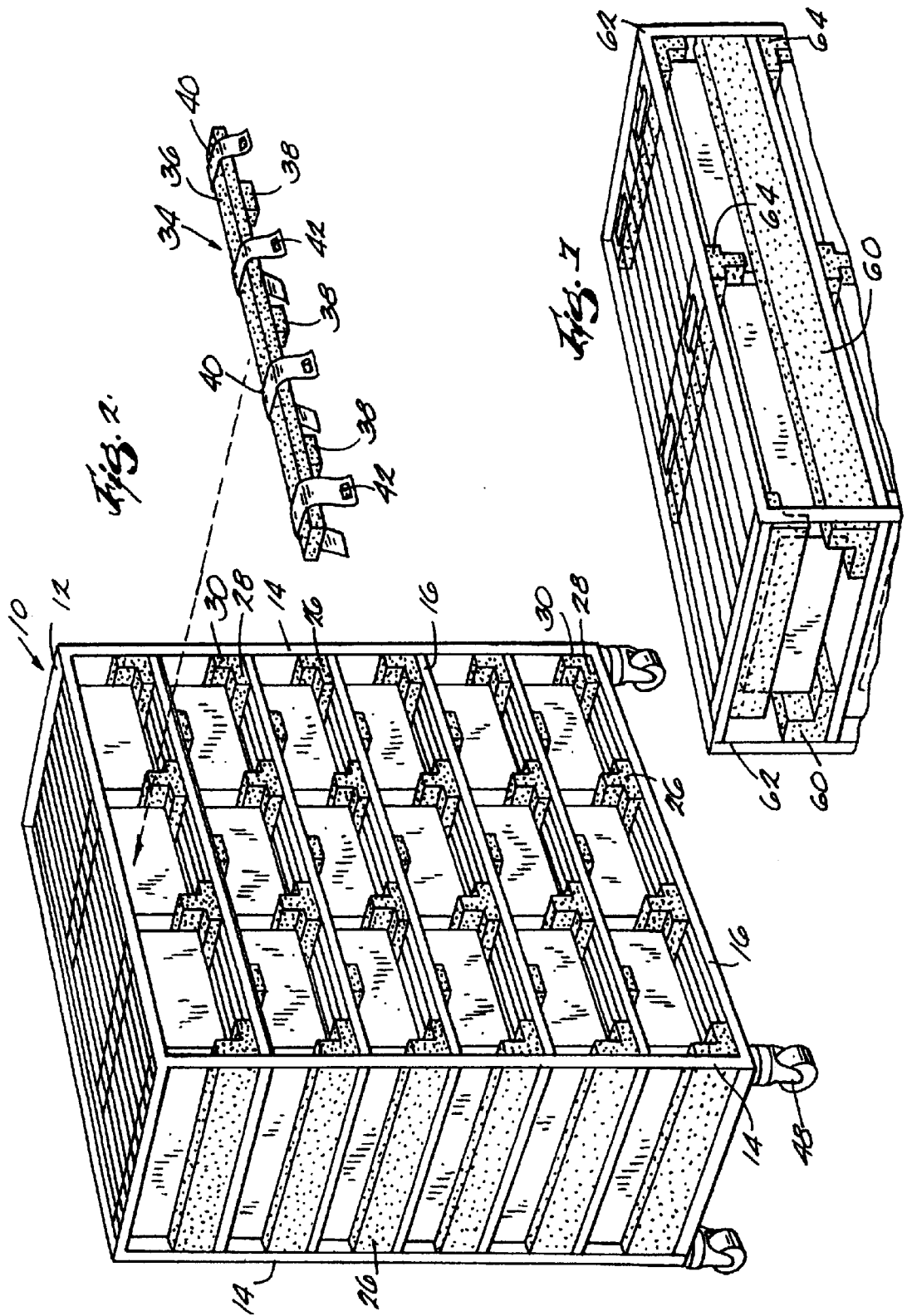

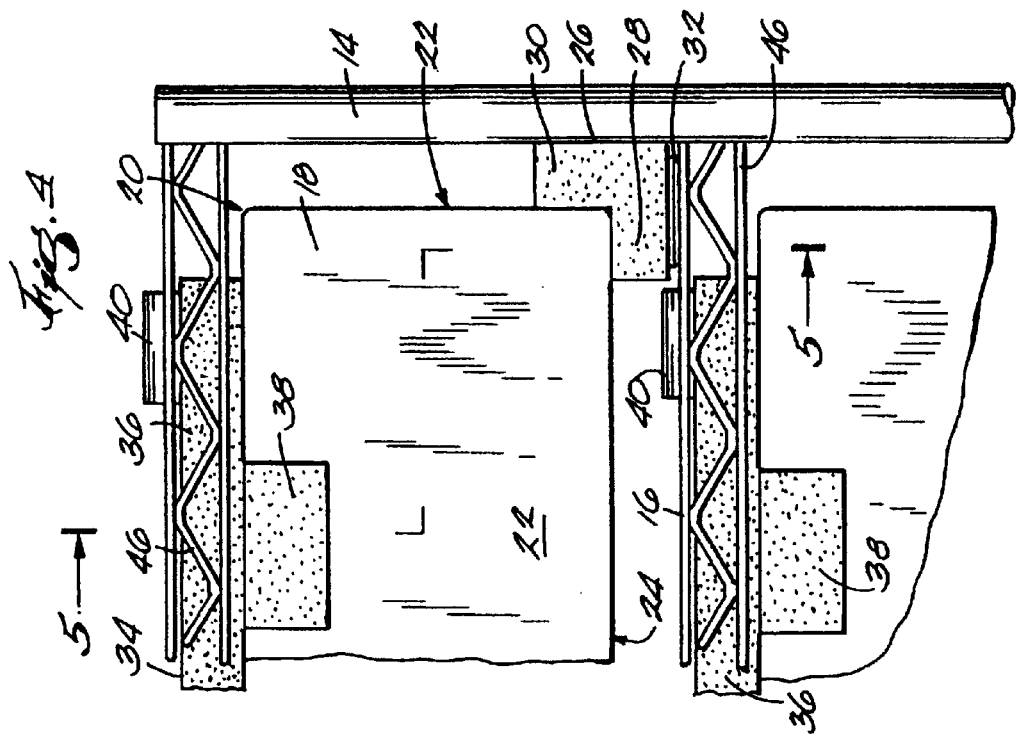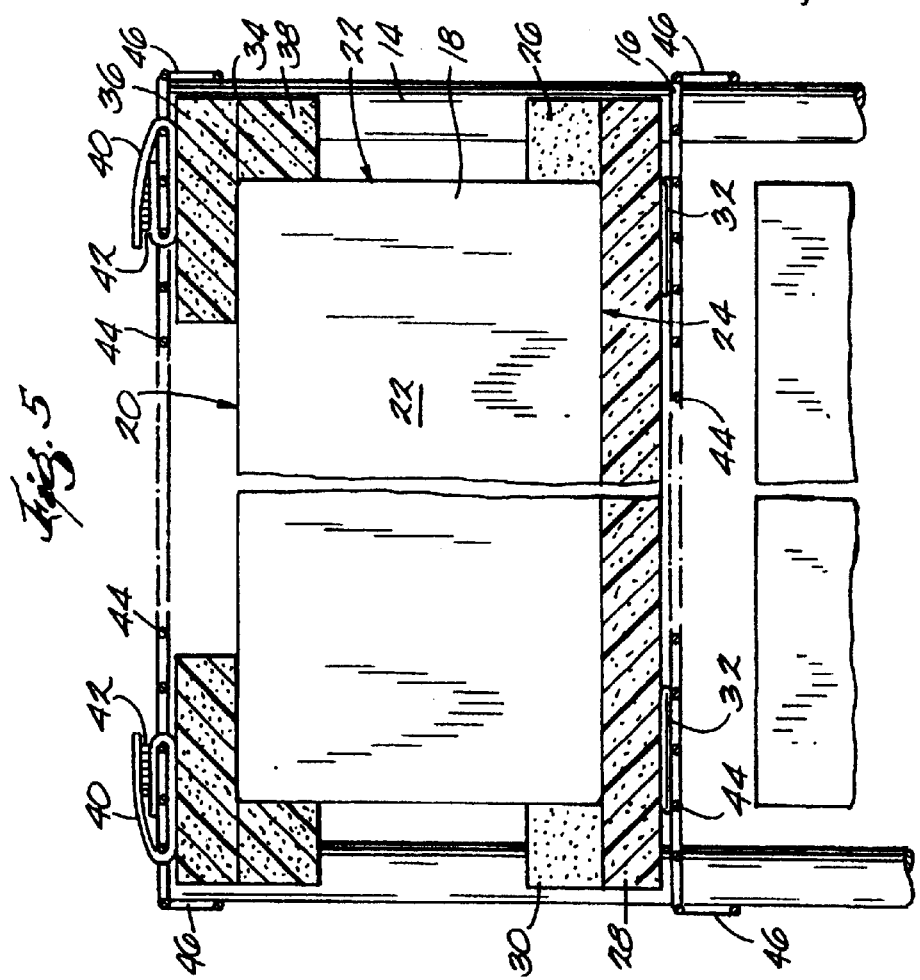

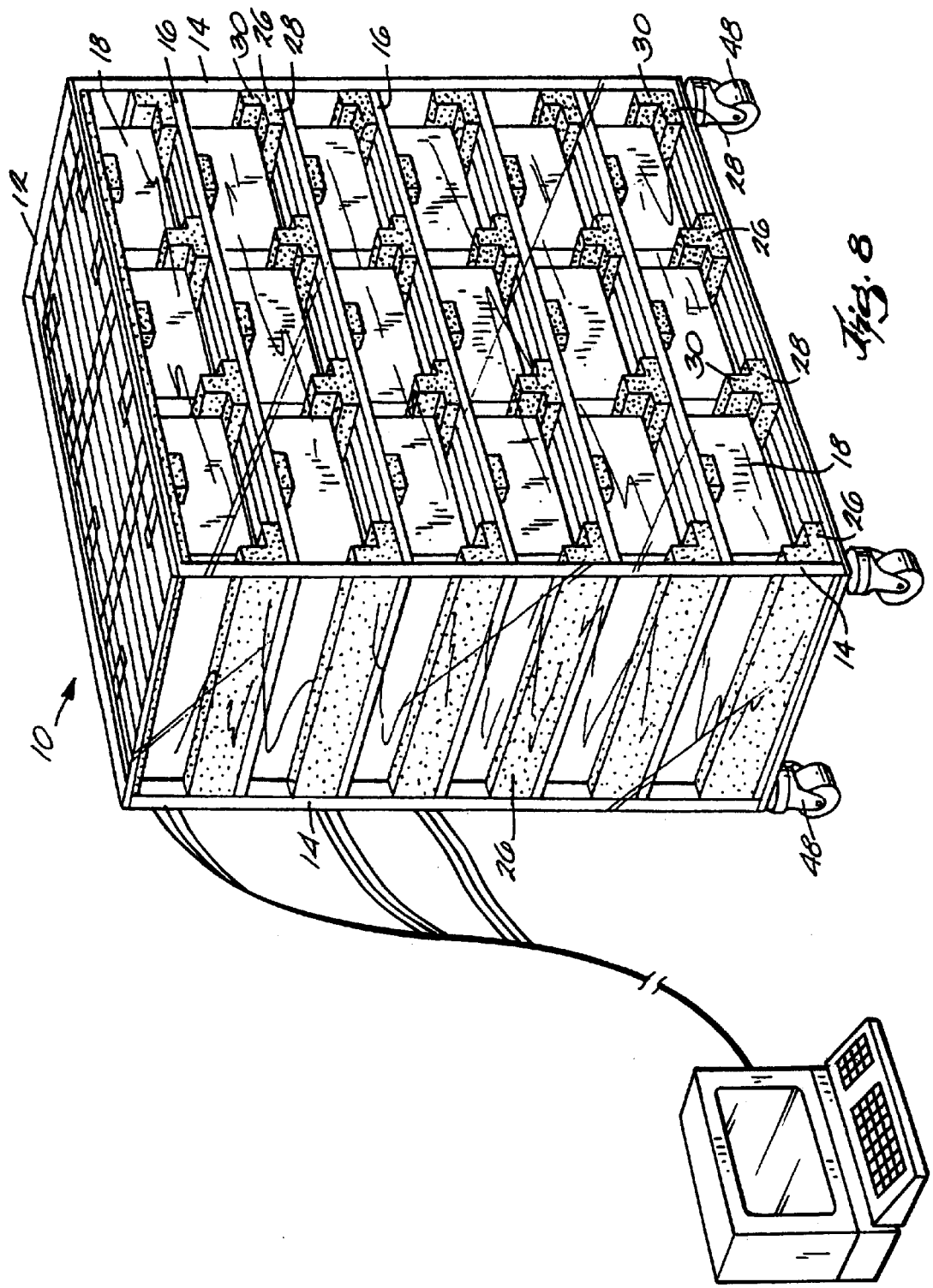

METHOD OF MANUFACTURING, PACKING AND TRANSPORTING COMPUTERS

RELATED APPLICATIONS

This is a continuation of U.S. patent application Ser. No. 09/072,845 filed on May 5, 1998 and issued as U.S. Pat. No. 6,135,706 on Oct. 24, 2000, the entire disclosure of which is incorporated herein by reference.

FIELD OF THE INVENTION

The present invention generally relates to the field of computers, and specifically to the field of manufacturing, packing, and transporting personal computers.

BACKGROUND OF THE INVENTION

Because of their fragile nature, personal computers must be handled with extreme care during packing and transporting operations. Typically, computers are packaged at the manufacturing facility using cardboard boxes and resilient inserts. For example, large foam blocks can be positioned over the ends of the computer, and the resulting assembly can then be inserted into a heavy-duty cardboard box. The box is subsequently sealed closed by taping or gluing.

To provide adequate protection from the shocks that can be incurred during the transporting process, it is well-known that the foam blocks must be relatively thick. Typically, the foam is roughly half the thickness of the computer on all sides of the computer. In addition, in order to allow the packaged computers to be stacked, the cardboard box must be very strong. Due to the size of the computers and the thickness of the foam, these boxes must also be very large. It is estimated that the foam and cardboard associated with packaging computers costs roughly $12 per computer.

During transport, the computers are commonly stacked onto a pallet and secured in place using packing straps, stretch wrap, or both. When stacked in this configuration, roughly eighteen (18) computers can be stacked onto a pallet. The packaged and palleted computers occupy roughly eighty-six (86) cubic feet.

When the packaged computer is received by the user, the box is cut open, typically using a knife or other sharp tool. The computer and foam are then carefully removed from the box, and the foam blocks are removed from the end of the computer. The user must then dispose of the cardboard and foam, which is undesirable from an environmental perspective. If a large quantity of computers are being received, the tasks of opening the boxes, removing the computers, and disposing the packaging materials can be significant, and can result in considerable expense to the user.

SUMMARY OF THE INVENTION

The present invention provides a method of manufacturing, packing, and transporting computers that does not require the above-described thick foam blocks and heavy-duty cardboard, thereby saving considerable up-front cost in packing computers. In addition, the present invention facilitates transporting computers in a more compact arrangement, thereby reducing transportation costs. The present invention also avoids the need to open boxes and remove the computers from boxes, thereby saving the user time when receiving the computers. The present invention also does not utilize disposable foam and/or cardboard, and therefore saves the time and money associated with disposal of these items and is more environmentally sound.

More specifically, instead of using individual cardboard boxes, thick foam blocks, and pallets, the present invention utilizes a rack that safely holds a plurality of computers. The rack includes at least one support member dimensioned to support a plurality of computers. At least one shock-absorbing pad (e.g., anti-static polyethylene) is supported by the support member, and the computers are supported by the shock-absorbing pad(s). The rack can be provided with rollers mounted to a bottom portion of the rack to facilitate movement of the assembly onto and off of a transport vehicle.

The shock-absorbing pad can include a lower portion positioned under at least one of the computers, and/or a side portion positioned along a side of at least one of the computers. Preferably, at least one of the pads includes a unitary lower portion that supports more than one computer (e.g., in inverted T-shaped pad). The pad can be secured to the support member in such a manner that it can be selectively detached from the support member (e.g., using a hook and loop fastener). The assembly can also include at least one upper shock-absorbing pad positioned above the computers. Preferably, the upper shock-absorbing pad comprises an upper portion positioned above at least one of the computers and a side portion positioned along a side of at least one of the computers.

The above-described rack can be utilized to practice an innovative method of manufacturing, packing, and transporting a plurality of computers. The method includes the steps of assembling a plurality of computers, providing a rack adapted to support the computers, and positioning the computers onto the rack. The method continues by loading the rack onto a transport vehicle at a first location (e.g., at the manufacturing facility), moving the loaded transport vehicle to a second location (e.g., at the buyer's facility), unloading the rack from the transport vehicle, and removing the computers from the rack.

Preferably, the providing step includes the step of placing a shock-absorbing pad on the rack, and the positioning step comprises positioning the computers onto the shock-absorbing pad. In addition, a shock-absorbing pad can be positioned above and on the sides of the plurality of computers. In one embodiment, the rack includes rollers, in which case the loading step includes rolling the rack onto the transport vehicle, and the unloading step includes rolling the rack off of the transport vehicle. In order to reduce contamination of the computers, the method can further include the step of wrapping the rack with a barrier material (e.g., stretch wrap).

If desired, some of the concepts of the present invention can be utilized to perform a method of distributing new or refurbished computers within a facility. For example, the buyer of computers can receive the computers (e.g., in boxes or otherwise) and place them on a mobile rack. The rack can then be moved from a first location within the buyer's facility to a second location where a computer is removed from the rack (e.g., at the location where the computer will be operated). If the computer is replacing an old computer, then the old computer can be placed onto the rack (e.g., in the location where the new or refurbished computer was located). The rack can then be moved to additional locations for delivery and/or pickup of additional computers.

BRIEF DESCRIPTION OF THE DRAWINGS

FIG. 1 is a perspective view of a rack assembly holding a plurality of computers and covered with stretch wrap.

FIG. 2 is a perspective view of the rack of FIG. 1 with the stretch wrap and one of the upper supports removed.

FIG. 3 is an enlarged perspective view of the rack of FIG. 2 with one of the computers removed.

FIG. 4 is an enlarged front view of the rack in FIG. 1 with the stretch wrap removed.

FIG. 5 is a section view taken along line 5—5 in FIG. 4.

FIG. 7 is a partial perspective view of an alternative embodiment of the present invention.

FIG. 8 is a perspective view of a rack according to the present invention, shown with computers being programmed on the rack.

DETAILED DESCRIPTION

Figure 6:
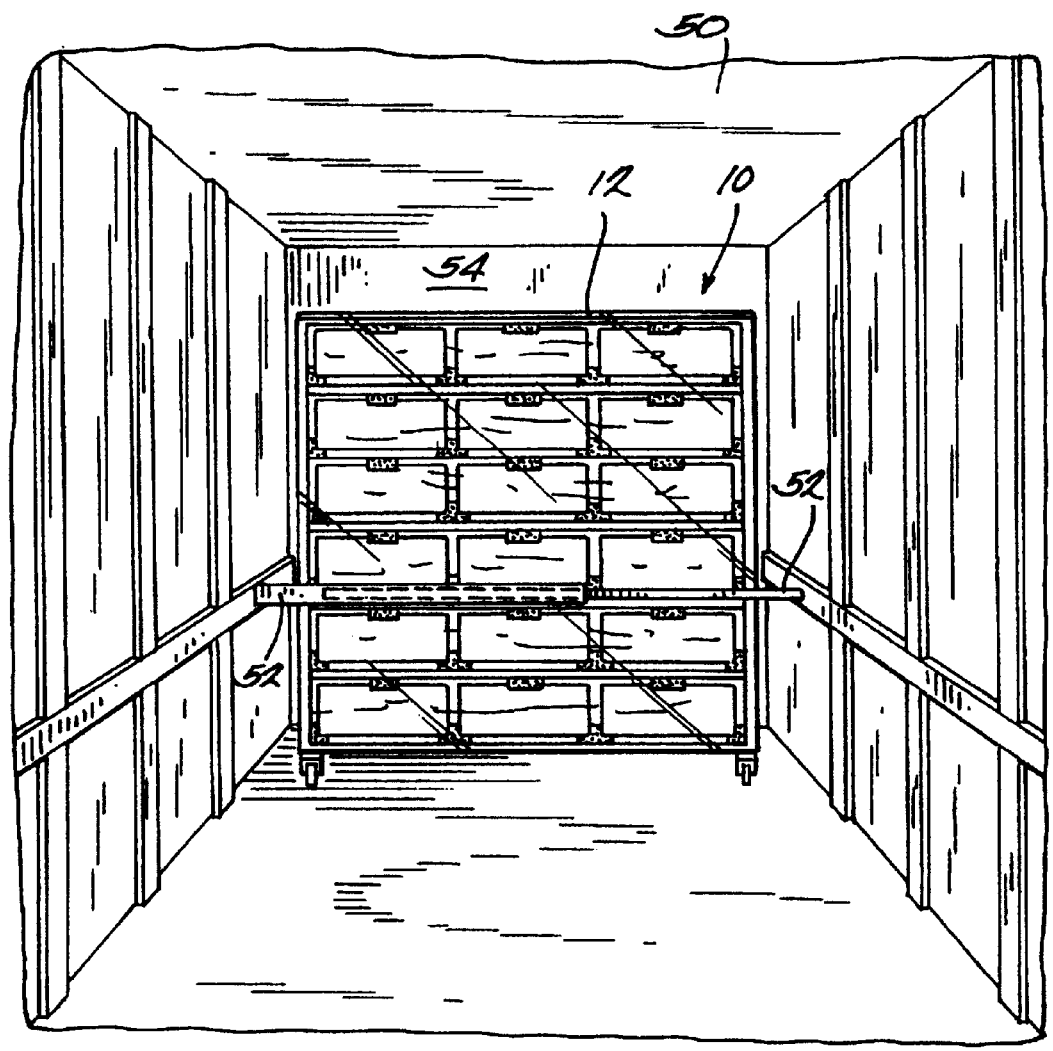
FIG. 6 is a perspective view of the interior of a transport vehicle with the rack and computer assembly of FIG. 1 secured in place.

FIGS. 1–3 illustrate a rack and computer assembly embodying the present invention. The illustrated assembly 10 includes a rack 12 having vertical members 14 supporting a series of support members 16 vertically spaced with respect to each other. Each support member 16 is dimensioned to support one or more computers 18. As used herein, the term computer refers to the portion of a personal computer that contains the computer's microprocessor. Each computer 18 includes a top 20, a bottom 22, and four sides 24.

Each support member 16 includes one or more shock-absorbing pads. In the illustrated embodiment, each support member 16 includes four lower pads 26 positioned to support three computers 18 in spaced relation relative to the corresponding support member 16. More specifically, each lower pad 26 includes a lower portion 28 positioned under at least one computer 18 and a side portion 30 positioned along a side of at least one computer 18. As can be seen in FIG. 1, the two lower pads 26 on the ends of each support member 16 are L-shaped to support one end of a computer 18, and the two lower pads 26 toward the middle of each support member 16 are an inverted T-shape to support the sides of two different computers 18.

Each of the lower pads 26 is detachably secured to a corresponding support member 16. In the illustrated embodiment, a selectively detachable fastener is used to detachably secure each lower pad 26 to the corresponding support member 16. As used herein, the term selectively detachable means that it can be detached without the need for tools. For example, referring to FIGS. 4 and 5, a hook and loop fastener 32 could be utilized with the hook portion secured to the lower pad 26 and the loop portion secured to the support member 16. By making the lower pads 26 detachable, the lower pads 26 can be repositioned relative to the support members 16 to accommodate computers of different sizes and to facilitate quick replacement of the lower pads 26.

Referring to FIG. 2, the assembly 10 further includes an upper pad 34 positioned above the computers 18. Each upper pad 34 includes an upper portion 36 positioned above the top of the computers 18 and a side portion 38 positioned along a side of the computers 18. In the illustrated embodiment, each upper portion 36 spans the width of three computers 18 and includes three individual side portions 38 for supporting the sides of each corresponding computer 18. Although not explicitly shown in FIG. 2, the opposing side of each computer 18 is also supported by an upper pad 34.

The upper pads 34 are also detachable from the support members 16. In the illustrated embodiment, the upper pads 34 are provided with straps 40 that can be secured to the rack 12. For example, referring to FIGS. 4 and 5, each strap 40 can be provided with a hook and loop fastener 42 to allow the strap 40 to be wrapped around a support member 16 and secured back onto itself. It should be appreciated that the use of detachable fasteners for the pads is not necessary to practice the present invention. In fact, it has been found that, due to the configuration of the support members 16 (described below in more detail), the upper pads 34 stay in place without the need for the straps 40. However, the straps 40 are helpful in keeping the upper pads 34 in place on the rack 12 when not being used to support a computer 18 (e.g., when an empty rack is being transported).

Referring to FIGS. 4 and 5, each support member 16 of the illustrated embodiment is of a metal wire frame design. The wire frame design facilitates wrapping the straps 40 of the upper pad 34 between the wire members 44 to secure the upper pad 34 to the rack 12. Each support member 16 further includes front and rear lip portions 46 that extend downwardly from the front and rear of each support member 16. The lip portions 46 provide strength and rigidity to the support members 16. In addition, the lip portions 46 assist in maintaining the upper pads 34 in position.

The shock-absorbing pads of the present invention can comprise any suitable material. For example, in the illustrated embodiment, the shock-absorbing pads comprise anti-static polyethylene. However, it is also within the scope of the present invention to use alternative shock-absorbing materials such as foam rubber, polymer elastomers, springs, or any other suitable material.

Each rack 12 is also provided with rollers 48 secured to a bottom portion of the rack. The rollers 48 facilitate moving the rack 12 onto and off of a transport vehicle 50. In addition, the rollers 12 facilitate using the rack 12 for delivering the computers 18 to the appropriate work stations upon arrival at the user's facility. The rollers 48 can comprise a typical caster, and preferably also include locking devices (not shown) that can be actuated by the user to inhibit the rack from moving during transport.

In order to prevent the assembly 10 from tipping during transport, the transport vehicle 50 can be provided with a securing device. Referring to FIG. 6, the illustrated securing device includes a load bar 52 that spans the width of the transport vehicle 50. The load bar 52 is positioned approximately at the mid-point of the assembly 10. The load bar 52 sandwiches the assembly 10 against the wall 54 of the transport vehicle 50, against another rack, or against another load bar. Instead of a load bar 52, the securing device could instead comprise straps (not shown) secured to the wall and wrapped around the rack, a clamping mechanism secured to the wall and clamped to the rack, or any other suitable device. In this manner, the rack 12 is prevented from tipping in the transport vehicle 50 during transportation operations.

The above-described computer and rack assembly 10 is wrapped in a barrier material. The illustrated barrier material comprises a transparent stretch wrap material (FIG. 1) that is commonly used to wrap boxed and palleted computers. The barrier material is utilized to inhibit contamination of the computers during transport.

FIG. 7 illustrates an alternative embodiment of the present invention. In the alternate embodiment, the lower pads 60 extend the length of the rack 62, and the upper pads 64 extend the width of the rack 62.

The above-described rack assembly can be used to practice a method of manufacturing, packing and transporting computers in accordance with the present invention. The method includes the step of assembling a plurality of computers 18. The assembly of computers involves assembling individual computer components (e.g., motherboards, chips, hard drives, etc.) into a computer shell. Assembly of computers is well-known in this field, and should require no further description. The method further includes the steps of providing the rack 12, positioning the computers 18 onto the rack 12, and loading the rack 12 onto a transport vehicle 50 at a first location. The transport vehicle 50 can then be moved to a second location where the rack 12 is unloaded from the transport vehicle 50 and the computers 18 are removed from the rack 12.

It should be appreciated that the method can also include adding the shock-absorbing pads to the rack to protect the computers from being damaged during transport. Positioning the pads below, above, and on the sides of the computers is preferred. In addition, the rack can be provided with rollers 48 to facilitate rolling the rack 12 onto the transport vehicle 50 and off of the transport vehicle 50. In a preferred embodiment, the method further includes the step of locking the rollers 48 and securing the racks 12 in the transport vehicle using the above-described securing device.

By utilizing the above-described rack assembly, it has been found that the total shipping volume of the computers has been significantly reduced. More specifically, the total shipping volume of eighteen computers on the above-described rack is about fifty-seven (57) cubic feet, compared to about eighty-six (86) cubic feet for the same eighteen computers that are packaged in the typical foam and boxes and stacked onto a pallet. This results in a reduction of about thirty-four percent (34%) on the shipping volume. In addition, because the rack is rolled onto the transport vehicle as opposed to lifted by a forklift, it is believed that the potential for damage to the computers is significantly reduced.

The rack can also be used to distribute new or refurbished computers within a facility (e.g., the buyer's facility). More specifically, the rack can be moved from a first location within a facility to a second location within the facility. At the second location, a computer can be removed from the rack, preferably at the location where the computer will be operated. If the computer is replacing an old computer, the old computer can be placed on the rack, where the new computer was located, and subsequently transported to a desired location (e.g., for refurbishing, disposing, or transporting to a different facility). It should be appreciated that this method can be performed even if the computers do not arrive at the buyers facility on the racks. That is, the buyer can receive the computers in any form (e.g., in boxes) and place them on the racks.

The above-described methods are preferably both performed so that the computers are placed on racks at the manufacturing facility, transported on racks, and delivered to the desired locations within the buyer's facility using racks. In a preferred method, the buyer maintains one or more racks on site so that old computers can be placed onto the racks. When a shipment of new computers arrives (i.e., on racks) from the manufacturer, the racks of new computers are removed from the transport vehicle, and the racks of old computers are loaded onto the vehicle. The old computers can be returned to the manufacturer for salvaging or refurbishing. Utilizing this method, it can be appreciated that the buyer will always have one or more racks on site so that the receipt and delivery of computers can be performed in an efficient manner.

In some instances, the buyer will want to customize the computers in some fashion. For example, the buyer may want to download software, network information, or other information onto the computers that the buyer receives from the manufacturer. This process is made more efficient by the use of the above-described racking system and by providing a master programming computer with multiple connections. In a preferred embodiment, the racks hold eighteen computers, and the master programming computer includes eighteen independent connectors that can be connected to the eighteen computers on the rack simultaneously the master programming computer can then be used to selectively program the eighteen computers on the rack.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of reducing computer packaging and distribution costs in the assembly and transport of new computers, the method comprising:

assembling a plurality of new computers at a manufacturing facility;

placing the plurality of new computers unpackaged upon a rack at the manufacturing facility;

positioning the plurality of computers in a compact arrangement on the rack enabled by the lack of packaging around the computers;

loading the rack with the plurality of computers upon a vehicle;

moving the vehicle from the manufacturing facility to a facility of a second party;

unloading the rack with the plurality of computers from the vehicle;

transporting the rack to a desired location in the second party's facility;

removing the unpackaged computers from the rack; and the second party receiving the unpackaged computers.

2. The method as claimed in claim 1, further comprising:

transporting the rack back to the vehicle at the second party's facility;

loading the rack back upon the vehicle;

moving the vehicle back to the manufacturing facility;

unloading the rack from the vehicle at the manufacturing facility; and repeating all steps at least once.

3. The method as claimed in claim 1, further comprising:

placing at least one old computer unpackaged upon the rack at the second party's facility;

transporting the rack back to the vehicle;

loading the rack back upon the vehicle; and moving the vehicle with the rack away from second party's facility.

4. The method as claimed in claim 1, further comprising:

connecting the plurality of new computers on the rack to a master computer; and programming the plurality of new computers on the rack by the master computer.

5. The method as claimed in claim 1, further comprising reducing the exposure of the plurality of new unpackaged computers on the rack to shock and vibration during the placing, positioning, loading, moving, unloading, transporting, and removing steps.

6. A method of manufacturing and distributing computers to customers, comprising:

assembling a plurality of computers at a computer manufacturing facility;

placing the plurality of computers upon a rack adapted to support the plurality of computers;

loading the rack with the plurality of computers upon a vehicle;

moving the vehicle from the computer manufacturing facility to a facility of a customer;

unloading the rack with the plurality of computers from the vehicle;

moving the rack with the plurality of computers to a first location in the customer's facility;

removing at least one of the computers from the rack;

delivering the at least one of the computers to the customer;

moving the rack to a second location in the customer's facility;

removing at least one other computer from the rack; and delivering the at least one other computer to the customer.

7. The method as claimed in claim 6, further comprising:

placing at least one other computer upon the rack at the customer's facility;

loading the rack upon the vehicle; and transporting the vehicle with the rack from the customer's facility.

8. The method as claimed in claim 6, further comprising:

repeating the second step of moving the rack and the step of delivering at least one other computer as many times as desired.

9. The method as claimed in claim 6, further comprising:

leaving the rack at the customer's facility;

loading a second rack at the customer's facility upon the vehicle;

moving the vehicle back to the manufacturing facility;

unloading the rack from the vehicle at the manufacturing facility; and repeating the assembling, placing, first loading, first moving, first unloading, first removing, and first delivering steps with the second rack.

10. The method as claimed in claim 6, further comprising:

releasably securing the rack within the vehicle prior to moving the vehicle; and releasing the rack from within the vehicle after moving the vehicle.

11. The method as claimed in claim 6, further comprising:

connecting the plurality of computers on the rack to a master computer; and programming the plurality of computers on the rack by the master computer.

12. The method as claimed in claim 6, further comprising:

loading the rack back upon the vehicle;

moving the vehicle from the customer's facility back to the manufacturing facility;

unloading the rack from the vehicle at the manufacturing facility; and repeating all assembling, placing, loading, moving, unloading, removing, and delivering steps at least once again.

13. The method as claimed in claim 6, further comprising reducing exposure of the plurality of computers to shock and vibration during the placing, loading, moving, unloading, and removing steps.

14. A method of performing a transaction in which computers are supplied by a computer supplier to a second party, the method comprising:

the computer supplier placing a plurality of unpackaged computers upon a rack at a facility of the computer supplier;

loading the rack with the plurality of unpackaged computers upon a vehicle at the computer supplier's facility;

moving the vehicle to a facility of the second party;

unloading the rack from the vehicle at the second party's facility;

transporting the rack from the vehicle to another location in the second party's facility;

removing at least one of the plurality of unpackaged computers from the rack;

the second party receiving the at least one of the plurality of unpackaged computers;

receiving another unpackaged computer from the second party;

placing the other unpackaged computer upon the rack at the second party's facility;

transporting the rack from the other location in the second party's facility back to the vehicle;

loading the rack upon the vehicle at the second party's facility; and returning the vehicle to the computer supplier's facility.

16. The method as claimed in claim 14 further comprising:

securing the rack in the vehicle prior to moving the vehicle; and unsecuring the rack after moving the vehicle.

16. The method as claimed in claim 14, further comprising:

connecting the plurality of unpackaged computers on the rack to a master computer; and programming the plurality of unpackaged computers on the rack by the master computer.

17. The method as claimed in claim 14, further comprising:

unloading the rack at the computer supplier's facility; and repeating all steps to define a systematic manner of performing computer supplying transactions between the computer supplier and second parties.

18. The method as claimed in claim 14, further comprising:

transporting a second rack to the vehicle at the second party's facility;

loading the second rack upon the vehicle at the second party's facility;

moving the vehicle back to the computer supplier's facility; and unloading the second rack from the vehicle at the computer supplier's facility.

19. The method as claimed in claim 14, further comprising reducing exposure of the plurality of unpackaged computers to shock and vibration during the placing, loading, moving, unloading, transporting, and removing steps.

* * * * *